Jan. 11, 1955   A. R. JOHNSON   2,699,294
TEMPERATURE RESPONSIVE CONTROL FOR WASTE DISPOSAL DEVICES
Filed Dec. 31, 1953

*INVENTOR.*
ARTHUR R. JOHNSON
BY 
HIS ATTORNEY

United States Patent Office 2,699,294
Patented Jan. 11, 1955

2,699,294

TEMPERATURE RESPONSIVE CONTROL FOR WASTE DISPOSAL DEVICES

Arthur R. Johnson, Newington, Conn., assignor to General Electric Company, a corporation of New York Application December 31, 1953, Serial No. 401,605

20 Claims. (Cl. 241—36)

The present invention relates to waste disposal apparatus adapted to reduce or comminute a mixture of garbage and water to produce a flowable mixture, and more particularly to improved control means for such apparatus.

In apparatus of this type garbage and other kitchen wastes are ground or shredded by a motor operated grinder in the presence of a flow of water supplied by a sink tap or the like, and the mixture of comminuted waste material and water is flushed through a drain line to the sewer system. For proper operation an adequate supply of water should be supplied during the entire grinding operation, and to prevent the softening or liquification of fat particles in the waste the water temperature should be below approximately 100° F.

Accordingly a primary object of my invention is to provide control means for waste disposal apparatus responsive to the temperature of the water supplied during grinding operations.

Another object of my invention is to provide improved waste disposal apparatus control means responsive to the quantity and temperature of water supplied to the comminuting chamber during comminuting operations.

Another object of my invention is to provide an improved waste disposal device having a water temperature and quantity control system built into or carried by the housing of the device.

Further objects and advantages of my invention will become apparent as the following description proceeds, and the features of novelty which characterize my invention will be pointed out with particularity in the claims appended to and forming a part of this specification.

Briefly stated, in one embodiment of my invention I provide a motor driven waste disposal device having a thermostatic switch supported thereon and connected in the motor circuit. The switch, which is closed at room temperature, includes a bimetallic actuator mounted in the device so as to be cooled by the water supplied to the grinding chamber (or heated if the temperature of the water is high) if the rate of flow of the water is sufficient to insure proper operation of the device. The thermostatic switch also includes a heating element in heat transfer relation with the bimetallic actuator and connected in the motor circuit so as to be energized whenever the motor is energized. Thus unless the thermostatic switch is supplied with an adequate supply of relatively cool water, the bimetallic actuator is heated by the heating element and opens the contacts of the switch to de-energize the motor.

For a better understanding of my invention reference may be made to the accompanying drawing in which.

Figure 1:
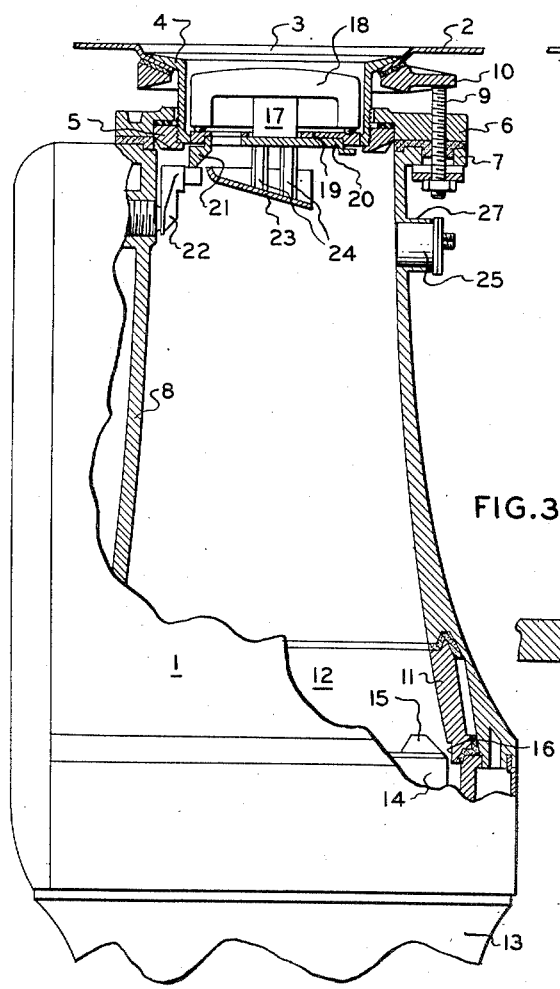
Fig. 1 is a fragmentary side elevation view, partly in section, of a waste disposal device embodying my invention.
Figure 2:
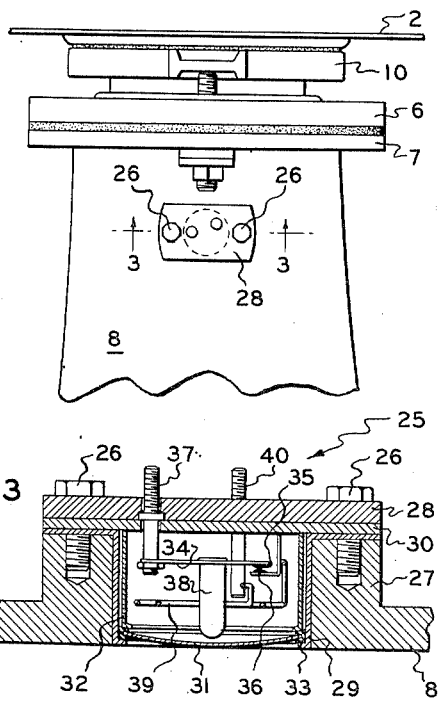
Fig. 2 is a fragmentary elevation at right angles to Fig. 1.

Referring now to the drawing, the numeral 1 designates a waste disposal device attached to a sink 2 at the drain opening 3 thereof. The attachment means, now well known in the art and forming no part of the present invention, includes a cup-like flange member 4 having a rim resting upon the rim of the sink opening. Flange 4 is attached to a ring 5 disposed below a head 6, and a flange 7 extending outwardly from the casing 8 accommodates the clamping screws 9 which pass through head 6 and butt against the clamping member 10 so as to hold the device firmly in place beneath the sink. It will be understood that there is a plurality of clamping screws 9, three for example, and that by means of resilient gaskets, several of which are shown in Fig. 1, the suspension of the device from the sink is cushioned so as to absorb vibrations and to protect the porcelain or other surface finish against damage. The casing 8 is frusto conical and includes an annular recess in which is mounted a frusto conical structure 11 which defines the grinding or comminution chamber 12. The two-part casing structure is advantageous in that the comminution chamber wall 11 is subject to abrasion and impact during the operation of the device and must therefore be of a hard wear resistant material, whereas the casing 8 may be of cast aluminum or other suitable light alloy. Suitably affixed to the lower portion of comminution chamber 12 is a motor housing 13 within which the motor (not shown) is mounted, the shaft of the motor being vertical and coaxial with the comminution chamber. The motor shaft carries a flywheel structure 14 on which is mounted a plurality of impeller blades 15. The lower portion of the comminution chamber wall 11 is formed with grooves or slots defining a suitable plurality of passages 16 which form paths of communication between the chamber 12 and an annular waste chamber below the flywheel which communicates with a suitable outlet connection (not shown).

Mounted in the drain opening 3 and supported in flange 4 is a combined stopper and control device 17 having a handle portion 18, a stopper face 19 with drain openings therein, and a shutter portion 20 connected to the handle and carrying a controlling cam surface 21. Mounted in the side wall of casing 8 is a control lever 22 positioned so as to be actuated by cam surface 21 when combined stopper and control device 17 is rotated to the position shown in Fig. 1 in which the openings in members 19 and 20 are aligned so as to permit the flow of water from the sink into chamber 12. Stopper 17 is of course removable from the sink drain opening and may also be positioned therein so as to seal the opening, in which position cam surface 21 is disengaged from lever 22. From the foregoing it will be seen that stopper 17 is generally similar to the combined stopper and control device described and claimed in Patent No. 2,185,037, issued to J. H. Powers and assigned to the assignee of the present invention.

For purposes hereinafter described I provide means for directing the water flowing through drain opening 3 laterally toward a wall portion of casing 8, such as a spout member 23 secured to stopper 17 by means of lug members 24 attached to shutter member 20. To effect control of my waste disposal device in accordance with the presence or absence of a suitable flow of water into the comminuting chamber and also in accordance with the temperature of the water I provide a heat responsive device mounted in the casing 8, preferably in a wall portion thereof adjacent its open end. In the embodiment disclosed herein the heat responsive device is a thermostatic switch 25 mounted in an opening in the side wall of casing 8 by suitable means such as bolts 26 secured to a mounting flange 27 integral with casing 8.

Figure 3:
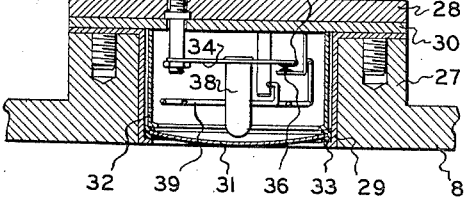
Fig. 3 is a cross-section taken along the line 3—3 in Fig. 2.

As best shown in Fig. 3 thermostatic switch 25 includes a housing formed by a base plate 28, a generally cup-shaped member 29 a layer of insulating material 30 and a circular bimetallic element 31 supported at its periphery in engagement with cup-shaped member 29 and a cylindrical support member 32. The joint between the periphery of bimetallic element 31 and cup-shaped member 32 is sealed by a gasket 33 providing a water tight enclosure for the switch elements located within the housing of the thermostatic switch. Bimetallic element 31, which functions as a switch actuator, is of the snap disk type and is arranged to remain in the convex position shown in Fig. 3 at normal room temperatures, but to snap inwardly to a concave position when heated to a predetermined temperature. This inward movement of bimetallic actuator 31 actuates flexible switch arm 34 so as to separate contact 35 mounted thereon from fixed contact 36. As shown in the drawing switch arm 34 is secured at one end to a terminal member 37 and carries a projection 38 extending toward the central portion of actuator 31 and located so as to be engaged thereby when it snaps to its concave position. Within switch 25 and in heat transfer relation with actuator 31 is a heating element 39 connected at one end to contact 36 and at the other end to a terminal 40 so that the heating element is energized whenever contacts 35 and 36 are in engagement. Heating element 39, which may be a coiled resistance wire as shown in Fig. 3, has sufficient heating capacity to cause actuator 31 to snap to its concave position and thus open contacts 35 and 36.

The discharge end of spout member 23 is spaced from the wall portion of casing 8 in which bimetallic member 31 is supported to form an air gap of a width such that the stream of water discharged from the spout contacts actuator 31 only when its rate of flow exceeds the rate of flow required for proper operation of the device. Thus if the flow of water from the sink through the opening in members 19 and 20 is sufficient for proper comminuting operation it will be discharged from spout 23 with sufficient velocity to impinge on member 31, whereas if the rate of flow is insufficient for this purpose the velocity of the stream will not carry it across the air gap to member 31 and instead the stream will drop by gravity and contact the wall of casing 8 below the thermostatic switch 25, if at all.

Figure 4:
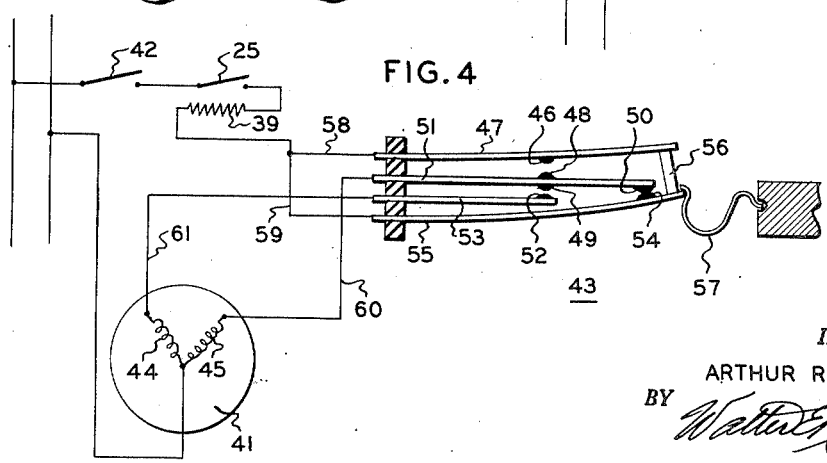
Fig. 4 is a diagram illustrating the control mechanisms with their electrical connections with the grinder motor controlled thereby.
Figure 4:

Referring now to Fig. 4, the motor 41 which drives flywheel 14 is connected in a motor control circuit with manually operable switch 42 (actuated by control lever 22), thermostatic switch 25, and a motor starting relay 43 arranged to maintain the starting current in the circuit for a predetermined interval of time. Motor 41 is provided with a starting winding 44 and a running winding 45, the common juncture of these windings being connected to one of the conductors of a suitable power source. Running winding 45 and also start winding 44, may be connected to the other conductor of the power source through relay 43 and switches 25 and 42. Relay 43 includes a contact 46 carried by flexible arm 47, contacts 48, 49 and 50 carried by flexible arm 51, contact 52 carried by flexible arm 53, and contact 54 carried at the end of a bimetallic arm 55. At the free end of bimetallic arm 55 a projection 56 rigidly secured thereto is arranged for movement into engagement with flexible arm 47, and to provide snap action of the mechanism the free end of arm 55 engages an over-center spring 57. Flexible arm 47 and bimetallic arm 55 are connected by means of wires 58 and 59 to heating element 39 which, as shown, is connected in series with switches 25 and 42. Arm 51 is connected to running winding 45 by wire 60 while arm 53 is connected to start winding 44 by wire 61. At normal room temperatures, and also when heated by the normal running current of motor 41, bimetallic arm 55 occupies the position shown in Fig. 4. In this position only contacts 54 and 56 are engaged and thus only running winding 45 is connected in the motor control circuit. However flexible arm 47 is biased toward arms 51 and 53 with sufficient force to cause engagement of contacts 46, 48 and 49, 52 when projection 56 is not in engagement with the free end of arm 47.

In describing the operation of my invention it will be assumed that combined stopper and control device 17 has been positioned in opening 3 and rotated to the position shown in Fig. 1, and that sink 2 is being supplied with relatively cool water, below 100° F. for example. Since switch 25 is normally closed at room temperature and since the rotation of stopper 17 to the position shown closes switch 42, this action establishes a circuit which may be traced from one of the power supply conductors through switches 42 and 25, heating element 39, wire 59, bimetallic element 55, switch contacts 50 and 54, arm 51, wire 60, and run winding 45, to the other conductor of the power supply. Heat is produced by heating element 39, and as previously explained this heat will cause bimetallic actuator 31 to open switch 25, thus completely de-energizing the motor circuit, unless actuator 31 is cooled by the flow of water from spout 23. The arrangement is such that motor 41 is never permitted to run for more than a very short period, if at all, unless the water supplied from sink 2 is at a temperature low enough to prevent the softening or liquification of fat particles in the waste material in the comminuting chamber, and the rate at which it is supplied is sufficient to meet the requirements of the grinding means. If the quantity of the water supplied is sufficient but its temperature is too high more heat will be supplied to actuator 31 than is removed by contact with the flow of water, and consequently contacts 35 and 36 will be disengaged, thus interrupting the motor circuit. Also contacts 35 and 36 will be opened if the stream of water delivered by spout 23 does not have sufficient velocity to cross the air gap and contact actuator 31 even though the temperature of the water may approach the freezing point.

To reduce to a minimum the delay in the opening of switch 25 corresponding to the time required to heat actuator 31 from room temperature to its switch actuating temperature, element 39 may be initially energized at a wattage higher than its normal rated wattage. In the present embodiment, rapid preheating of heating element 39 is provided by the utilization of a modified motor starting relay which includes means for maintaining the starting current for a predetermined interval of time, during which heater 39 is energized at a relatively high wattage. In operation, motor starting relay 43 permits a relatively high current to pass through the motor circuit before the motor starts, and then switches the starting winding in and out of the circuit in the usual manner. Initially current flows through bimetallic element 55 of relay 43 and running winding 45; after a predetermined relatively short interval element 55 is heated by the current flowing therethrough sufficiently to cause it to snap out of engagement with arm 47. This permits engagement of contacts 46, 48 and 49, 52 thus energizing both starting winding 44 and running winding 45. Motor 41 then starts and during the interval before it reaches running speed bimetallic arm 55 cools and returns to the position shown in Fig. 4; in this position the circuit through starting winding 44 is interrupted while the circuit through running winding 45 is established through contacts 50 and 54. While the running current now flows through bimetallic arm 55, this current is not great enough to heat the arm sufficiently to cause it to move from the position shown, and unless an overload occurs motor 41 will continue to run until the circuit is interrupted by manually operated switch 42 or thermostatic switch 25. From the foregoing description it will be evident that if switch 25 is designed to open before bimetallic arm 55 snaps out of engagement with arm 47, motor 41 will not start unless an adequate flow of water is supplied to chamber 12.

Figure 5:
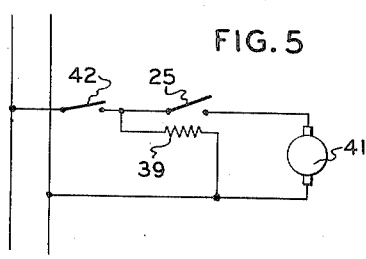
Fig. 5 is similar to Fig. 4 but shows a modified form of my invention.

Referring now to the modified form of my invention shown in Fig. 5, heating element 39 is connected in parallel with motor 41 and thermostatic switch 25 so that it is energized whenever switch 42 is closed, while motor 41 is energized only when both switch 42 and switch 25 are closed. The operation of this modified form of my invention is essentially the same as that described above except that no means are provided for preheating heating element 39 so as to decrease the time interval between the energization of motor 41 and the opening of switch 25 as a result of insufficient supply of relatively cool water to the grinding chamber. However in the embodiment shown in Fig. 5 heating element 39 is not de-energized upon the opening of switch 25 and hence remains at its operating temperature so long as switch 42 is closed.

From the foregoing description it will be apparent that I have provided an improved temperature responsive control for waste disposal devices which provides means for detecting the presence of an adequate flow of water at the proper temperature, is relatively simple and positive in operation, and which may be easily incorporated in food waste disposers of the type disclosed herein. Furthermore, my invention performs the functions of a flow control switch in the cold water line of the sink to which the disposer unit is secured but does not require the breaking of existing water supply lines, inasmuch as all of the control elements of my invention are carried by the casing of the disposer. Another advantage is that control of the grinding motor is achieved without placing any restrictions in the water flow path other than the spout attached to the stopper, and without utilizing any moving parts (which might be made inoperative by food particles or grease) in the water flow path.

As previously described, the starting of the comminuting mechanism motor does not occur immediately after the main switch is actuated even though an adequate flow of water is supplied; this time delay is in fact beneficial because it permits saturation of the waste material before its comminution is started. Also, the need for a separate overload switch in the motor circuit is eliminated by my invention, since my flow responsive thermal switch may be arranged to always open when locked rotor current flows through its heating element.

While I have shown and described two specific embodiments of my invention, I do not desire my invention to be limited to the particular constructions shown and described and I intend by the appended claims to cover all modifications within the true spirit and scope of my invention.

What I claim as new and desire to secure by Letters Patent of the United States is:

1. Waste disposal apparatus comprising means for comminuting waste material, motor means for effecting operation of said comminuting means, manually operable means for controlling the operation of said motor means to render said comminuting means operative and inoperative, means for supplying a flow of water to said comminuting means, a thermostatic element responsive to the temperature of said water, a heating element arranged to be energized concurrently with said motor means and mounted in heat transfer relation with said thermostatic element, and switch means actuated by said thermostatic element for rendering said manually operable means ineffective to cause operation of said comminuting means unless water at a temperature lower than a predetermined temperature is supplied thereto.

2. Waste disposal apparatus comprising means for comminuting waste material, a motor for effecting operation of said comminuting means, a manually operable control switch connected in circuit with said motor so as to control the supply of power thereto, means for supplying a flow of water to said comminuting means, a thermostatic element responsive to the temperature of said water, a heating element connected in circuit with said control switch so as to be energized concurrently with said motor, said heating element being mounted in heat transfer relation with said thermostatic element, and a switch actuated by said thermostatic element in series circuit relation with said control switch, said thermostatic element and said heating element being constructed and arranged so that said motor is de-energized unless water at a temperature lower than a predetermined temperature is supplied to said comminuting means.

3. Waste disposal apparatus comprising means for comminuting waste material, a motor for effecting operation of said comminuting means, a manually operable control switch connected in circuit with said motor so as to control the supply of power thereto, means for supplying a flow of water to said comminuting means, a thermostatic switch actuator responsive to the temperature of said water and arranged to operate an auxiliary switch connected in series with said control switch, a heating element for supplying heat to said actuator connected in series with said motor, said thermostatic element and said heating element being constructed and arranged so that said motor is de-energized unless water at a temperature lower than a predetermined temperature is supplied to said comminuting means, and a motor starting relay in circuit with said motor, said relay including means for maintaining the starting current in said motor circuit for a predetermined interval of time whereby said heating element is rapidly raised to its normal operating temperature.

4. Waste disposal apparatus comprising means for comminuting waste material, a motor for effecting operation of said comminuting means, manually operable means for controlling the operation of said motor to render said comminuting means operative and in operative, means for supplying a flow of water to said comminuting means, a thermostatic element responsive to the temperature of said water, a heating element connected in parallel circuit relation with said motor and mounted in heat transfer relation with said thermostatic element, and switch means actuated by said thermostatic element for rendering said manually operable means ineffective to cause operation of said comminuting means unless water at a temperature lower than a predetermined temperature is supplied thereto.

5. Waste disposal apparatus comprising means for comminuting waste material, a motor for effecting operation of said comminuting means, a manually operable control switch connected in circuit with said motor so as to control the supply of power thereto, means for supplying a flow of water to said comminuting means, a thermostatic switch actuator responsive to the temperature of said water and arranged to operate an auxiliary switch connected in series with said control switch, a heating element for supplying heat to said actuator connected in parallel with said motor and auxiliary switch whereby heat is continuously supplied to said actuator when said control switch is closed, said actuator and heating element being constructed and arranged so that said auxiliary switch is actuated to de-energize said motor unless water at a temperature lower than a predetermined temperature is supplied to said comminuting means.

6. Waste disposal apparatus comprising means for comminuting waste material, motor means for effecting operation of said comminuting means, manually operable means for controlling the operation of said motor means to render said comminuting means operative and inoperative, means for supplying a flow of water to said comminuting means including means for directing said flow in a first path when the rate of flow exceeds a predetermined value and in a second path when said rate is less than said value, a thermostatic element located in said first path, a heating element arranged to be energized concurrently with said motor means and mounted in heat transfer relation with said thermostatic element, and switch means actuated by said thermostatic element for rendering said manually operable means ineffective to cause operation of said comminuting means unless a flow of water at a rate exceeding said predetermined value and at a temperature lower than a predetermined temperature is supplied thereto.

7. Waste disposal apparatus comprising means for comminuting waste material, a motor for effecting operation of said comminuting means, a manually operable control switch connected in circuit with said motor so as to control the supply of power thereto, means for supplying a flow of water to said comminuting means including means for directing said flow in a first path when the rate of flow exceeds a predetermined value and in a second path when said rate is less than said value, a thermostatic element located in said first path, a heating element connected in circuit with said control switch so as to be energized concurrently with said motor, said heating element being mounted in heat transfer relation with said thermostatic element, and a switch actuated by said thermostatic element in series circuit relation with said control switch, said thermostatic element and said heating element being constructed and arranged so that said motor is de-energized unless a flow of water at a rate exceeding said predetermined value and at a temperature lower than a predetermined temperature is supplied to said comminuting means.

8. Waste disposal apparatus comprising means for comminuting waste material, a motor for effecting operation of said comminuting means, a manually operable control switch connected in circuit with said motor so as to control the supply of power thereto, means for supplying a flow of water to said comminuting means including means for directing said flow in a first path when the rate of flow exceeds a predetermined value and in a second path when said rate is less than said value, a thermostatic switch actuator located in said first path and arranged to open a normally closed auxiliary switch connected in series with said control switch, a heating element for supplying heat to said actuator connected in series with said motor, said actuator and said heating element being constructed and arranged so that said motor is de-energized unless a flow of water at a rate exceeding said predetermined value and at a temperature lower than a predetermined temperature is supplied to said comminuting means, and a motor starting relay in circuit with said motor, said relay including means for maintaining the starting current in said motor circuit for a predetermined interval of time, whereby said heating element is rapidly heated to its normal operating temperature.

9. Waste disposal apparatus comprising means for comminuting waste material, a motor for effecting operation of said comminuting means, manually operable means for controlling the operation of said motor to render said comminuting means operative and inoperative, means for supplying a flow of water to said comminuting means including means for directing said flow in a first path when the rate of flow exceeds a predetermined value and in a second path when said rate is less than said value, a thermostatic element located in said first path, a heating element connected in parallel circuit relation with said motor and mounted in heat transfer relation with said thermostatic element, and switch means actuated by said thermostatic element for rendering said manually operable means ineffective to cause operation of said comminuting means unless a flow of water at a rate exceeding said predetermined value and at a temperature lower than a predetermined temperature is supplied thereto.

10. Waste disposal apparatus comprising means for comminuting waste material, a motor for effecting operation of said comminuting means, a manually operable control switch connected in circuit with said motor so as to control the supply of power thereto, means for supplying a flow of water to said comminuting means including means for directing said flow in a first path when the rate of flow exceeds a predetermined value and in a second path when said rate is less than said value, a thermostatic switch actuator located in said first path, and arranged to operate an auxiliary switch connected in series with said control switch, a heating element for supplying heat to said actuator connected in parallel with said motor and auxiliary switch whereby heat is continuously supplied to said actuator when said control switch is closed, said actuator and heating element being constructed and arranged so that said auxiliary switch is actuated to de-energize said motor unless a flow of water at a rate exceeding said predetermined value and at a temperature lower than a predetermined temperature is supplied to said comminuting means.

11. Waste disposal apparatus comprising a casing defining a grinding chamber, motor operated grinding means in said chamber, means for supplying water to said chamber, a control system for said grinding means including a thermostatic switch carried by said casing, a heating element connected in said system and arranged to supply heat to said switch for opening the contacts thereof, and means for directing the water supplied to said chamber into heat transfer relation with said switch so as to maintain said contacts in closed position so long as water at a temperature lower than a predetermined temperature is supplied to said chamber.

12. Waste disposal apparatus comprising a casing defining a grinding chamber, motor operated grinding means in said chamber, means for supplying water to said chamber, a switch in the motor circuit, a thermostatic actuator for said switch carried by said casing, a heating element for said actuator connected in said motor circuit, and means for directing the water supplied to said chamber into heat transfer relation with said actuator, whereby said switch is maintained in closed position so long as water at a temperature lower than a predetermined temperature is supplied to said chamber.

13. Waste disposal apparatus comprising a casing defining a grinding chamber, motor operated grinding means in said chamber, means for supplying water to said chamber, a switch in the motor circuit, a thermostatic actuator for said switch mounted in said chamber, a heating element connected in said circuit and supported by said casing in heat transfer relation with said actuator, and means for directing the water supplied to said chamber into contact with said actuator so as to maintain said switch in closed position so long as water at a temperature lower than a predetermined temperature is supplied to said chamber.

14. Waste disposal apparatus comprising a casing defining a grinding chamber having a generally vertical side wall and a top opening, motor operated grinding means at the bottom of said chamber, a thermostatic switch in the motor circuit including a bimetallic actuator supported on said wall adjacent said top opening, a heating element connected in said circuit and mounted in heat transfer relation with said actuator, water flow control means in said top opening movable into a position allowing water to flow into said chamber, and spout means carried by said flow control means for directing said water in a generally horizontal stream across an air gap into contact with said actuator, said air gap being sufficiently wide that said stream contacts said actuator only when its rate of flow exceeds a predetermined value, and said actuator being constructed and arranged to open said switch when said water fails to remove heat from said actuator at a rate exceeding the rate at which heat is supplied thereto by said heating element.

15. Waste disposal apparatus comprising a vertical generally tubular casing enclosing a grinding chamber and having an open end adapted to be connected to the flange of a sink drain opening, motor operated grinding means at the bottom of said chamber, a combined stopper and control device supported in said opening and engagable with a switch lever carried by said casing, a control switch operated by said lever in circuit with the motor, a spout carried by said control device and arranged to direct water flowing through said opening laterally toward a wall portion of said casing adjacent said open end, a thermostatic switch including a bimetallic actuator supported in an opening in said wall portion, a heating element mounted in heat transfer relation with said actuator, said thermostatic switch being connected in series with said control switch and said heating element being connected in circuit therewith so as to be energized whenever said motor is energized, the discharge end of said spout being spaced from said wall portion to form an air gap of a width such that the stream of water discharged from said spout contacts said actuator only when its rate of flow exceeds a predetermined value, and said actuator being constructed and arranged to open said switch when said water fails to remove heat from said actuator at a rate exceeding the rate at which heat is supplied thereto by said heating element.

16. Waste disposal apparatus comprising means for comminuting waste material, motor means for effecting operation of said comminuting means, means for supplying a flow of water to said comminuting means, heat responsive control means for rendering said motor means operative and inoperative, and heating means in heat transfer relation with said control means, said control means being located so as to be in heat transfer relation with said flow of water and arranged to render said motor means inoperative unless cooled by water at a temperature lower than a predetermined temperature.

17. Waste disposal apparatus comprising means for comminuting waste material, motor means for effecting operation of said comminuting means, means for supplying a flow of water to said comminuting means, switch means for controlling the operation of said motor means to render said comminuting means operative and inoperative, heat responsive means for actuating said switch means to render said comminuting means inoperative when heated to a predetermined temperature, and heating means in heat transfer relation with said heat responsive means, said heat responsive means being located so as to be in heat transfer relation with said flow of water and arranged to render said comminuting means inoperative unless cooled by water at a temperature lower than a predetermined temperature.

18. Waste disposal apparatus comprising means for comminuting waste material, motor means for effecting operation of said comminuting means, manually operable means for controlling the operation of said motor means to render said comminuting means operative and inoperative, means for supplying a flow of water to said comminuting means including means for directing said flow in a first path when the rate of flow exceeds a predetermined value and in a second path when said rate is less than said value, a heating element controlled by said manually operable means, and heat responsive control means in heat transfer relation with said heating element and located so as to be in heat transfer relation with water flowing in said first path, said heat responsive control means being constructed and arranged to render said manually operable means ineffective to cause operation of said comminuting means unless water at a temperature lower than a predetermined temperature is supplied thereto.

19. Waste disposal apparatus comprising a casing defining a grinding chamber, motor operated grinding means in said chamber, means for supplying water to said chamber, a control system for said grinding means including heat responsive means carried by said casing for rendering said grinding means inoperative when heated to a predetermined temperature, heating means connected in said system and arranged to supply heat to said heat responsive means, and means for directing the water supplied to said chamber into heat transfer relation with said heat responsive means so as to render said grinding means operative so long as water at a temperature lower than a predetermined temperature is supplied to said chamber.

20. Waste disposal apparatus comprising a casing defining a grinding chamber, motor operated grinding means in said chamber, means for supplying water to said chamber, a control system for said grinding means including switch means and heat responsive actuating means therefor carried by said casing, said actuating means being arranged to actuate said switch means to open circuit position when heated to a predetermined temperature, heating means connected in said system and arranged to supply heat to said actuating means, and means for directing the water supplied to said chamber into heat transfer relation with said actuating means so as to maintain said switch means in closed circuit position so long as water at a temperature lower than a predetermined temperature is supplied to said chamber.

References Cited in the file of this patent

UNITED STATES PATENTS

| | | |
|---|---|---|
| 2,278,911 | Breckenridge | Apr. 7, 1942 |
| 2,471,924 | Bolesky | May 31, 1949 |
| 2,518,176 | Powers | Aug. 8, 1950 |